Patented Apr. 2, 1940

2,195,966

UNITED STATES PATENT OFFICE 2,195,966

PRODUCTION OF FURONITRILE

Benjamin W. Howk and Charles G. Wortz, Wilmington, Del., assignors to E. I. du Pont de Nemours & Company, Wilmington, Del., a corporation of Delaware No Drawing. Application May 20, 1938, Serial No. 209,141

8 Claims. (Cl. 260—345)

This invention relates to a catalytic process, and more particularly it relates to a vapor phase catalytic dehydration process for the preparation of furonitrile. More specifically this invention relates to a vapor phase catalytic dehydration process for the production of furonitrile from furoic acid and ammonia.

Furonitrile, which is sometimes referred to as pyromuconitrile, has been known for many years. For example, Wallach (Ann., 214, 227 (1882)) and Ciamician (Ber., 14, 1058 (1881)) prepared furonitrile by dehydration of furamide with phosphorus pentachloride; Douglas (Ber., 25, 1313 (1892)) prepared furonitrile by dehydration of furfuraldoxime with acetic anhydride. Furonitrile may also be synthesized by the reaction of 2-bromofurane with metallic cyanides. However, none of these methods have been developed into practicable commercial processes for the manufacture of furonitrile, either because the individual reactions are adapted for laboratory operation only or because the reagent costs become prohibitive in large scale operations. Moreover, in the methods referred to above several steps are involved in preparing the necessary furane intermediates, which adds considerably to the probable cost of furonitrile prepared by such chemical processes.

A process for the conversion of long-chain fatty acids to nitriles that comprises passing a mixture of vaporized fatty acid and ammonia over a dehydrating catalyst at elevated temperatures has been described in the copending application Serial No. 173,196, of Charles G. Wortz, filed November 6, 1937. In this application it is pointed out that the operating conditions, especially the temperature, must be controlled within relatively restricted limits in order to avoid not only incomplete conversions but troublesome side reactions that lead to a substantial decrease in the yield of the desired corresponding nitriles. In view of the behavior of the long-chain fatty acids, which are usually considered to be relatively stable, a fragile molecule such as that of furoic acid would not be expected to survive in the process. Furfural and furfural derivatives are characterized by their sensitivity to heat, acids, and alkalis. The system of conjugated double bonds in the nucleus of furane is at least partly responsible for their tendency to undergo polymerization to form tars and resins. This effect has been noted especially among the oxygenated derivatives. Moreover, owing to the semi-aromatic character of the furane ring, furane carboxylic acids are readily decarboxylated in the presence of catalysts at rather mild temperatures. However, it has now been found that by working under carefully controlled conditions within a restricted temperature range furoic acid can be converted to furonitrile by passing the vaporized material over dehydrating catalysts in the presence of ammonia.

Accordingly, this invention has as an object to provide a direct vapor phase catalytic process for the production of furonitrile from furoic acid and ammonia. A further object is to provide an efficient vapor phase catalytic process wherein polymerization, decarboxylation, and other undesirable side reactions are avoided. A still further object is to prepare furonitrile from furoic acid by an economical one-step process. Other objects will appear hereinafter.

These objects are accomplished by the following invention which comprises bringing a mixture of ammonia gas and a vaporized member of the group consisting of furoic acid, its anhydride, its esters, its ammonium salt, and its amide into contact with a dehydrating catalyst, at temperatures within the range between about 275° C. and about 375° C.

A more detailed description of this process is provided in the following examples, which illustrate but in no way limit the invention.

Example 1

A glass catalyst tube is charged with 200 cc. of 8–14 mesh acid extracted silica gel and heated to about 325° C. Ammonia is passed through the tube at the rate of 1.46 moles per hour. Furoic acid is vaporized and passed with the ammonia at the rate of 0.48 mole per hour. Upon passing through the catalyst bed the dehydration occurs, and the gaseous products issuing from the tube are condensed in a suitable receiver. There is obtained a certain amount of water-soluble solid material that is probably ammonium furoate together with water, and a liquid layer that is separated and subjected to purification by vacuum distillation. The latter comprises two products, furane, B. P. 30° to 31° C. and furonitrile, B. P. 145° to 146° C. From 140 g. of pure furoic acid there is obtained 28 g. of furonitrile corresponding to a molecular yield of 24%. Incompletely converted solid products are recovered and recycled in the process.

Example 2

Three hundred and seventy grams of furoic acid vapor is passed at the rate of 57 grams per hour through a reaction tube containing 200 cc.

of phosphated alumina hydrate catalyst maintained at a temperature of 360° C. A sufficient quantity of ammonia gas is passed with the furoic acid vapor so that the molecular ratio of ammonia to acid is about 5.8 to 1. Under these conditions the contact time is in the neighborhood of four seconds. The gaseous products are condensed and worked up according to the procedure described in Example 1. In addition to unchanged ammonium furoate there is obtained from the liquid layer 123 g. of furonitrile, B. P. 145° to 146° C. The conversion is 40% of theory. Under the conditions of this experiment furane is not formed in any appreciable amount.

The furoic acid may be readily prepared from furfural either by the Cannizzaro reaction, in which furfuryl alcohol is obtained as a by-product, or still better by carefully controlled oxidation of furfural with air.

Although the foregoing examples indicate the use of certain specific conditions of temperature, rates of flow, ammonia ratios, and the like, it is to be understood that these values may be varied somewhat without departing from the spirit and scope of the invention. Broadly speaking, the processes of this invention are operative for the production of furonitrile when carried out in the temperature range between 275° and 375° C., but preferably in the range from about 325° C. to 360° C. Even under these conditions conversion is not always complete, but the unconverted products are easily recovered and can be recycled in the process. Similarly, an excess of ammonia over and above the amount required theoretically for reaction with furoic acid is always employed, and the excess is recovered and recirculated.

The processes of this invention are usually carried out at ordinary atmospheric pressures. However, if so desired, subatmospheric or superatmospheric pressures may be employed. Although, from the economic point of view it is preferable to use furoic acid as a raw material for this synthesis; functional derivatives of furoic acid such as ammonium furoate or furamide may be employed equally as well. With the latter derivatives it is possible to substitute an inert carrier gas for at least part of the ammonia gas required in processing pure furoic acid.

As catalysts there may be employed either natural or synthetic dehydrating materials such as Japanese acid clay, silica gel, alumina-on-silica gel, phosphated alumina hydrate, and the like. All of these materials are solids characterized by excellent mechanical strength, and they are not attacked by the reaction vapors within the operable range of temperatures. In general it is preferable to use contact materials having little or no tendency to induce decarboxylation. Phosphated alumina hydrate is excellent in this respect. With catalysts that have a mild tendency to promote decarboxylation, such as silica gel, it is usually necessary to operate at lower temperatures to avoid excessive materials losses.

From the above description it is readily apparent that this invention provides a convenient, economical, and advantageous process for the preparation of furonitrile. Moreover, the furonitrile of this invention is a valuable product having a large number of potential uses in industry. Perhaps the most important use is in connection with the solvent refining of lubricating oils in which either furonitrile or its hydrogenation product, furfuryl amine, can be used to advantage for extracting undesirable constituents. Other uses will be apparent to those skilled in the art.

Now having described in full detail the preferred embodiments of this invention, it is to be understood that said invention is not to be limited to the specific embodiments thereof except as defined in the following claims.

We claim:

1. A process for the preparation of furonitrile which comprises bringing a vaporized member of the group consisting of furoic acid, its anhydride, ammonium salt, and amide in admixture with gaseous ammonia in excess of the amount which will react with the furoic compound, into contact with a solid dehydration catalyst at a temperature within the range between about 275° C. and 375° C.

2. A process for the preparation of furonitrile which comprises bringing furoic acid vapor, together with an excess of ammonia, into contact with a solid dehydrating catalyst at a temperature between about 275° C. and about 375° C.

3. The process in accordance with claim 1 characterized in that the reaction is carried out at a temperature from about 325° C. to about 360° C.

4. The process in accordance with claim 2 characterized in that the reaction is carried out at a temperature from about 325° C. to about 360° C.

5. The process in accordance with claim 1 characterized in that the dehydrating catalyst comprises as its essential catalytic component phosphated alumina hydrate.

6. The process in accordance with claim 1 characterized in that the dehydrating catalyst comprises as its essential component phosphated alumina hydrate, and that the reaction is carried out at a temperature from about 325° C. to about 360° C.

7. A process for the preparation of furonitrile which comprises bringing a vaporized member of the group consisting of furoic acid, its anhyride, ammonium salt, and amide in admixture with gaseous ammonia in excess of the amount which will react with the furoic compound, into contact with a solid dehyration catalyst at a temperature within the range between about 275° C. and 375° C., separating furonitrile from the resulting mixture and recycling the unconverted reactrants.

8. A process for the preparation of furonitrile which comprises passing furoic acid vapors together with a molecular excess of ammonia over phosphated alumina hydrate at a temperature from about 325° C. to about 360° C.

BENJAMIN W. HOWK.
CHARLES G. WORTZ.